United States Patent
Mishra et al.

(10) Patent No.: US 12,355,653 B2
(45) Date of Patent: Jul. 8, 2025

(54) SYSTEM AND METHOD FOR EVPN MULTICAST OPTIMIZATION FOR SOURCE HANDLING

(71) Applicant: Cisco Technology, Inc., San Jose, CA (US)

(72) Inventors: Mankamana Prasad Mishra, San Jose, CA (US); Ali Sajassi, San Ramon, CA (US); Nitin Kumar, San Jose, CA (US); Swadesh Agrawal, Fremont, CA (US); Anuj Budhiraja, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 32 days.

(21) Appl. No.: 17/884,259

(22) Filed: Aug. 9, 2022

(65) Prior Publication Data

US 2024/0056379 A1 Feb. 15, 2024

(51) Int. Cl.
*H04L 45/02* (2022.01)
*H04L 45/00* (2022.01)
*H04L 45/28* (2022.01)

(52) U.S. Cl.
CPC .............. *H04L 45/02* (2013.01); *H04L 45/22* (2013.01); *H04L 45/28* (2013.01)

(58) Field of Classification Search
CPC .......... H04L 45/02; H04L 45/22; H04L 45/28
See application file for complete search history.

(56) References Cited

U.S. PATENT DOCUMENTS

| | | | |
|---|---|---|---|
| 9,019,814 B1 | 4/2015 | Mohanty et al. | |
| 10,862,697 B2 | 12/2020 | Mishra et al. | |
| 2003/0005149 A1* | 1/2003 | Haas | H04L 45/28 709/238 |
| 2003/0021227 A1* | 1/2003 | Lee | H04L 45/125 370/216 |
| 2003/0023749 A1* | 1/2003 | Lee | H04L 45/22 709/240 |

(Continued)

FOREIGN PATENT DOCUMENTS

| | | | | |
|---|---|---|---|---|
| EP | 3065342 A1 * | 9/2016 | ......... | H04L 12/4641 |
| EP | 3151485 A1 | 4/2017 | | |

OTHER PUBLICATIONS

Internet Engineering Task Force (IETF), Request for Comments: 6513, Category: Standards Track, ISSN: 2070-1721, E. Rosen, Ed., Cisco Systems, Inc., R. Aggarwal, Ed., Juniper Networks, Feb. 2012, Multicast in MPLS/BGP IP VPNs, 88 pages, https://datatracker.ietf.org/doc/html/rfc6513.

(Continued)

*Primary Examiner* — Chris Parry
*Assistant Examiner* — Dixon F Dabipi
(74) *Attorney, Agent, or Firm* — Baker Botts L.L.P.

(57) ABSTRACT

A system and method for handling multicast traffic in Ethernet Virtual Private Network multi-homed networks includes receiving a first route table for a first route, determining that the first route table is associated with another peer device in the multi-home network, generating a second route table for a second route, determining a route to transmit data and the determined route is the first route or the second route based on the first preference value and the second preference value, and transmitting the data using the determined route.

15 Claims, 5 Drawing Sheets

(56) References Cited

U.S. PATENT DOCUMENTS

| | | | | |
|---|---|---|---|---|
| 2004/0185889 | A1* | 9/2004 | Shipman | H04L 45/26 |
| | | | | 455/517 |
| 2004/0218528 | A1* | 11/2004 | Shipman | H04L 45/42 |
| | | | | 370/232 |
| 2006/0056302 | A1* | 3/2006 | Ahn | H04L 45/00 |
| | | | | 370/389 |
| 2006/0268681 | A1* | 11/2006 | Raza | H04L 45/02 |
| | | | | 370/216 |
| 2008/0259784 | A1* | 10/2008 | Allan | H04L 45/02 |
| | | | | 370/216 |
| 2016/0191374 | A1* | 6/2016 | Singh | H04L 45/22 |
| | | | | 370/228 |
| 2016/0261487 | A1 | 9/2016 | Singh et al. | |
| 2018/0069727 | A1 | 3/2018 | Keesara et al. | |
| 2018/0302321 | A1* | 10/2018 | Manthiramoorthy | |
| | | | | H04L 12/4641 |
| 2020/0136958 | A1* | 4/2020 | Kouvelas | H04L 12/4641 |

OTHER PUBLICATIONS

Internet Engineering Task Force (IETF), Request for Comments: 6514, Category: Standards Track, ISSN: 2070-1721, R. Aggarwal, Juniper Networks, E. Rosen, Cisco Systems, Inc., T. Morin, France Telecom—Orange, Y. Rekhter, Juniper Networks, Feb. 2012, BGP Encodings and Procedures for Multicast in MPLS/BGP IP VPNs, 59 pages, https://datatracker.ietf.org/doc/html/rfc6514.

International Search Report and Written Opinion for International Application No. PCT/US2023/029097, mailed Oct. 12, 2023, 19 Pages.

Sajassi A., et al., "Seamless Multicast Interoperability between EVPN and MVPN PEs", Internet Draft, Jul. 5, 2019, pp. 1-36.

* cited by examiner

SYSTEM AND METHOD FOR EVPN MULTICAST OPTIMIZATION FOR SOURCE HANDLING

TECHNICAL FIELD

The present disclosure generally relates to the field of communications, including, but not limited to, a system and method for EVPN multicast optimization for source handling.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use multicasting or multi-home networks. However, conventional approaches can lead to traffic loss and extraneous bandwidth usage.

DESCRIPTION OF EXAMPLE EMBODIMENTS

Overview

Figure 1:
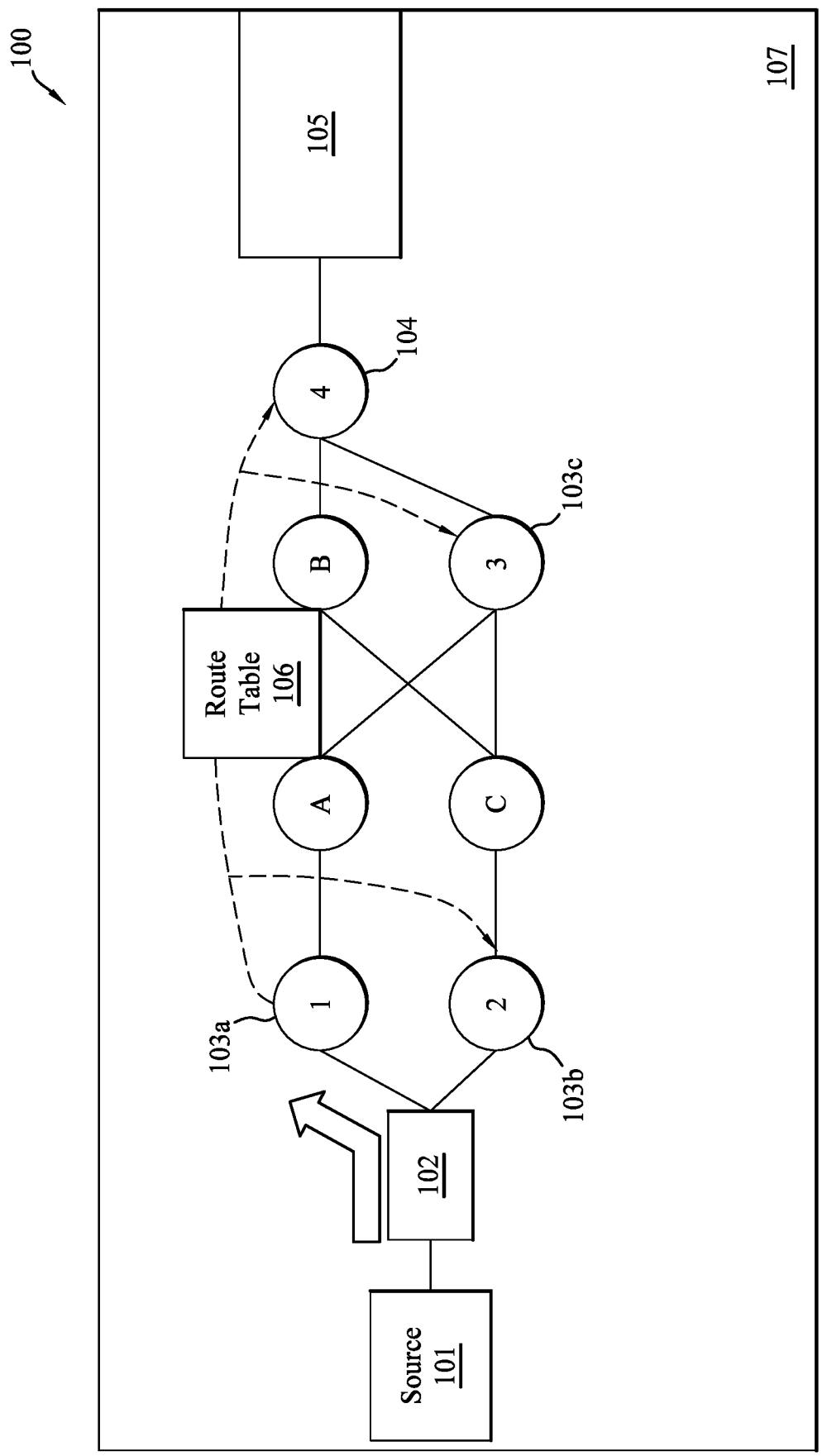
FIG. 1 illustrates a system for propagating multi-homed source routes, in accordance with certain embodiments.

Conventional approaches by communications providers to use multicasting or multi-home networks lead to traffic loss and extraneous bandwidth usage. Certain embodiments as described herein improve on these conventional approaches by control plane flooding routing tables that contain preference values to devices within a network, such that multicast receivers in the network can determine from where to efficiently request data, traffic, and/or packets.

According to one embodiment of the present disclosure, a method for transmitting data includes receiving a first route table for a first route, determining that the first route table is associated with another peer device in the multi-home network, generating a second route table for a second route, determining a route to transmit data and the determined route is the first route or the second route based on the first preference value and the second preference value, and transmitting the data using the determined route.

According to another embodiment, a system includes one or more processors and one or more computer-readable non-transitory storage media embodying instructions to the one or more processors. The one or more computer-readable non-transitory storage media include instructions that, when executed by the one or more processors, cause the system to perform operations including receiving a first route table for a first route, determining that the first route table is associated with another peer device in the multi-home network, generating a second route table for a second route, determining a route to transmit data and the determined route is the first route or the second route based on the first preference value and the second preference value, and transmitting the data using the determined route.

According to yet another embodiment, one or more computer-readable non-transitory storage media embody instructions that, when executed by a processor, cause the processor to perform operations including receiving a first route table for a first route, determining that the first route table is associated with another peer device in the multi-home network, generating a second route table for a second route, determining a route to transmit data and the determine route is the first route or the second route based on the first preference value and the second preference value, and transmitting the data using the determined route.

Technical advantages of certain embodiments of this disclosure may include one or more of the following. Certain systems and methods described herein conserve networking and bandwidth resources by reducing the number of times information is flooded, forwarded, or transmitted to different devices across the network in the course of transmitting data from a multicast source to a multicast receiver as compared to existing systems and methods for data transmission in multi-homed networks. Certain embodiments described herein conserve networking and bandwidth resources by using stored preference values to more efficiently transmit data, fragments, and/or packets via alternative routes or alternative devices within a network while a device in the network is inoperable.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
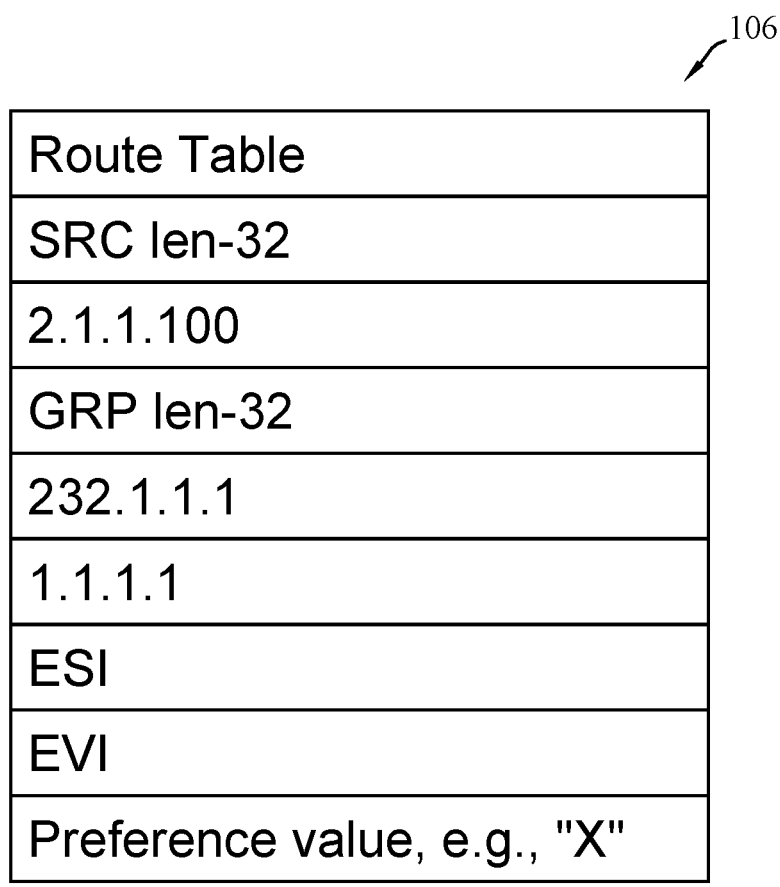
FIG. 2 illustrates a route table for propagating multi-homed source routes, in accordance with certain embodiments.
Figure 3:
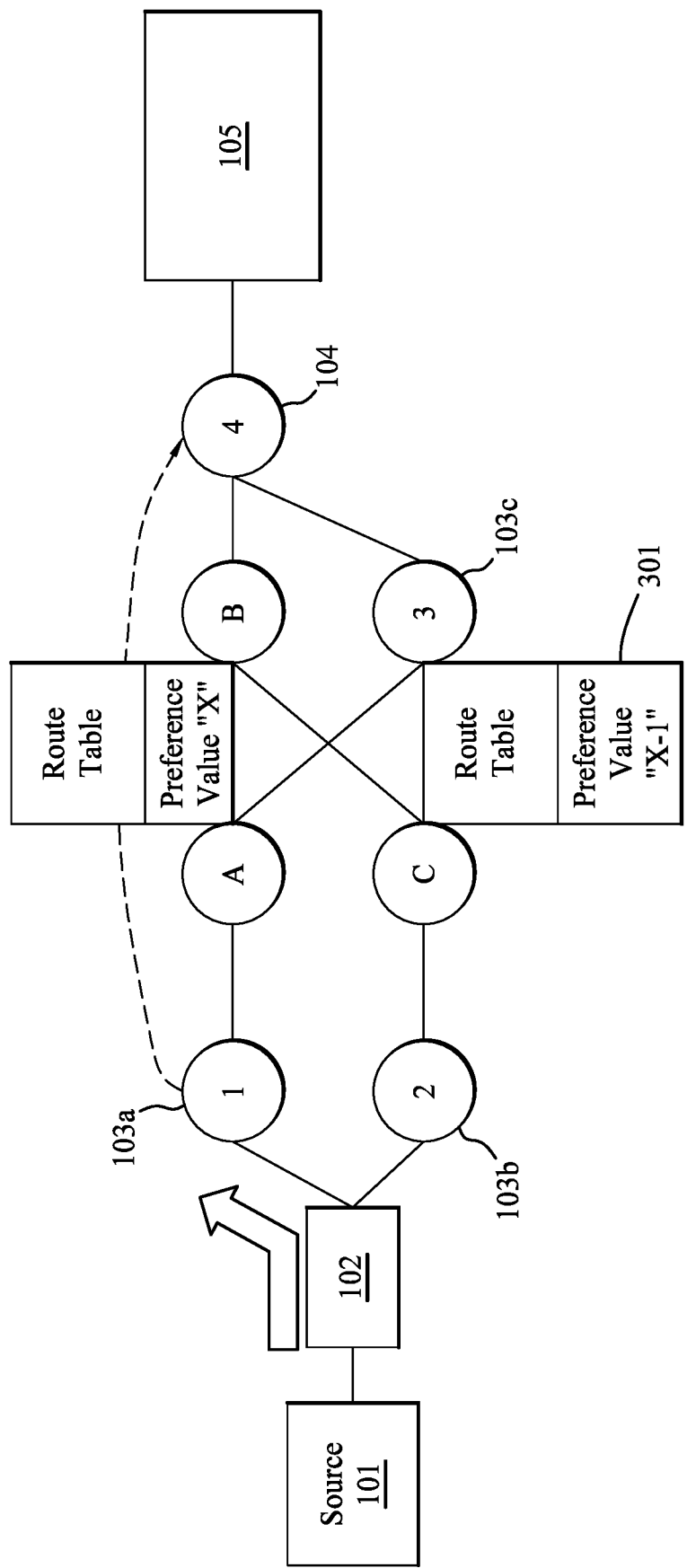
FIG. 3 illustrates a system for re-originating a route through a multi-home peer, in accordance with certain embodiments.
Figure 4:
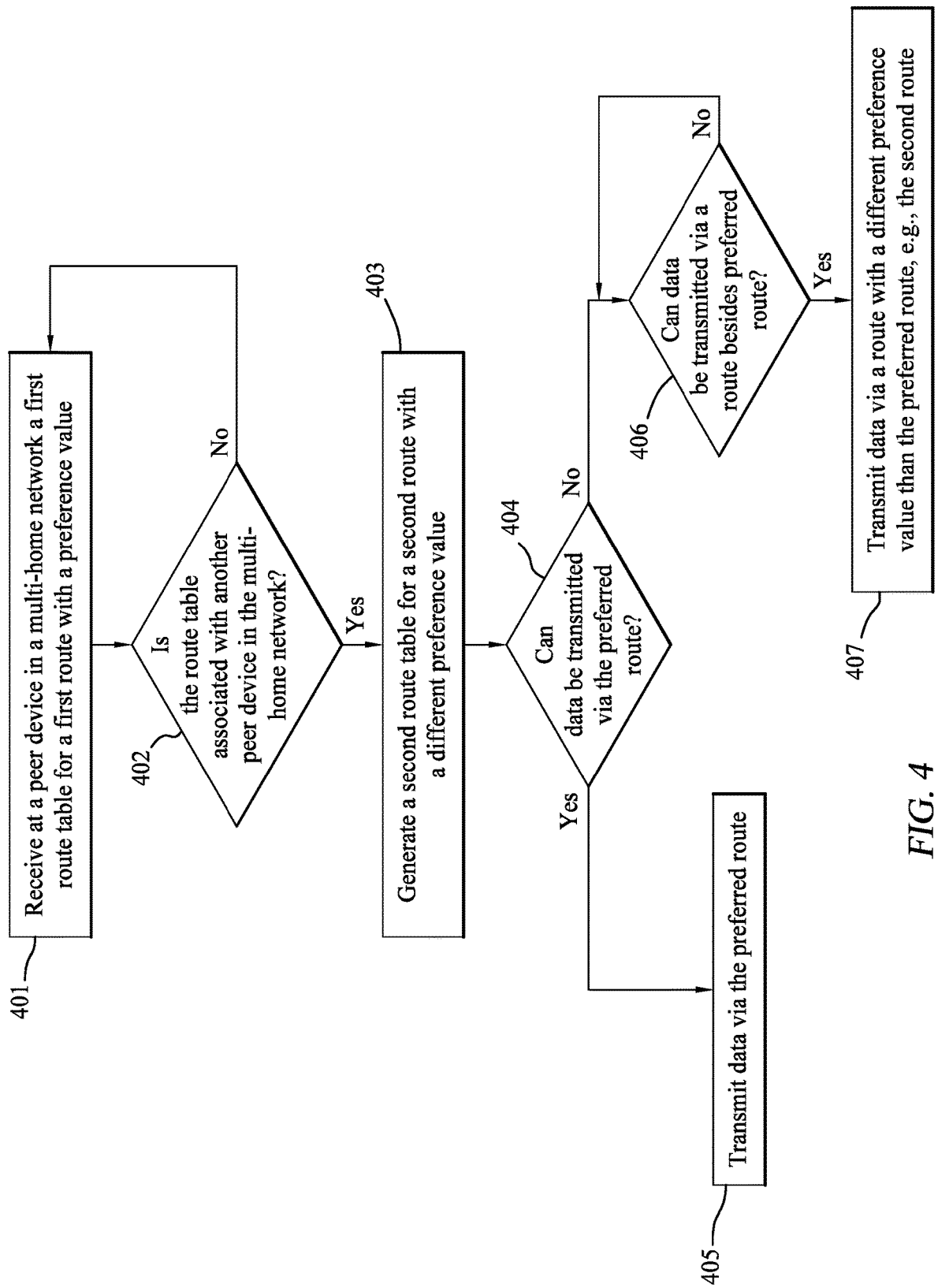
FIG. 4 illustrates a flow diagram for transmitting data using multi-homed source routes, in accordance with certain embodiments.
Figure 5:
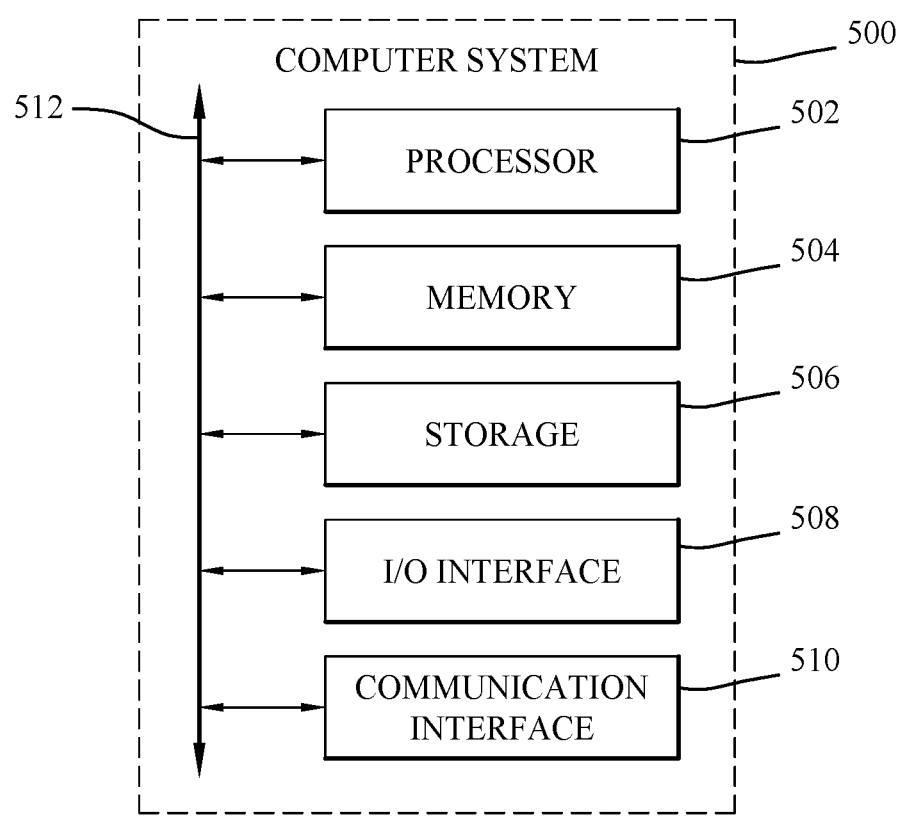
FIG. 5 illustrates an example of a computer system, in accordance with certain embodiments.

This disclosure describes systems and methods for transmitting data, fragments, and/or packets in a multi-homed network using Ethernet Virtual Private Network (EVPN). FIG. 1 illustrates a system for propagating multi-homed source routes, in accordance with certain embodiments. FIG. 2 illustrates a route table for propagating multi-homed source routes, in accordance with certain embodiments. FIG. 3 illustrates a system for re-originating a route through a multi-home peer, in accordance with certain embodiments. FIG. 4 illustrates a flow diagram for transmitting data using multi-homed routes, in accordance with certain embodiments. FIG. 5 illustrates an example of a computer system, in accordance with certain embodiments.

FIG. 1 is a diagram illustrating an example system 100, according to particular embodiments. System 100 or portions thereof may be associated with an entity, which may include any entity, such as a business or company (e.g., a service provider) that offers multicast services with EVPN for data traffic. The components of system 100 may include any suitable combination of hardware, firmware, and software. In the illustrated embodiment, system 100 includes a multicast source 101, a customer edge device 102, peer devices 103, a provider edge device 104, a multicast receiver 105, a routing table 106, and a network 107.

Multicast source 101 represents any suitable computing or storage device that functions as a source of distributing multicast content including, but not limited to, data, fragments, and/or packets. Multicast source 101 may communicate information or transmit data to customer edge devices 102, peer devices 103, provider edge devices 104 or other devices within network 107 via any appropriate wireless or wired means. Examples of multicast sources 101 may include user devices, such as a desktop computer system, a laptop or notebook computer system, a mobile telephone, a personal digital assistant (PDA), a tablet computer system, an augmented/virtual reality device, etc. Additional examples of multicast sources 101 may include servers, mainframes, data centers, cloud platforms, or any other computer system capable of transmitting a multicast stream.

Customer edge device 102 represents any suitable network device that facilitates communication between a customer's network and a network service provider's network. For example, a customer edge device 102 may include an edge router that is located on a customer's premises that provides an ethernet interface between the customer's Local Area Network (LAN) and the network service provider's core network. A provider edge device 104 represents any suitable network device that facilitates communication between one network service provider's area and areas administered by other network service providers. A provider edge device 104 may include edge routers and border routers. For example, provider edge devices 104 may facilitate communication between two different internet service providers.

Peer devices 103 represent any suitable network devices that facilitate communication between endpoints through a network. Peer devices 103 may include edge routers, core routers, virtual routers, backbone routers, enterprise routers, access routers, border routers, provider edge routers, and intermediate node routers, or the like. Peer devices 103 may be interconnected by the public Internet, a multiprotocol label switching (MPLS) virtual private network (VPN), Software-Defined Wide Area Network (SD-WAN), or the like.

Multicast receiver 105 represents any suitable network device that facilitates communication between a customer's network and a network service provider's network. For example, a multicast receiver 105 may include devices, such as a desktop computer system, a laptop or notebook computer system, a mobile telephone, a PDA, a tablet computer system, an augmented/virtual reality device, etc. Additional examples of multicast receiver 105 may include servers, mainframes, data centers, cloud platforms, or any other computer system capable of receiving a multicast stream.

Routing table 106 represents a data structure that facilitates communication and transmission of data between devices in system 100. Routing table 106 may be transmitted to devices in network 107 to share certain information regarding received traffic with various customer edge devices 102, peer devices 103, and provider edge devices 104. In certain embodiments, routing table 106 may include an IP address, a MAC address, Ethernet Segment Identifier (ESI) data, EVPN Instance (EVI) data, and a preference value. FIG. 2 illustrates an exemplary routing table 106 for propagating multi-homed source routes, in accordance with certain embodiments. Though routing table 106 is depicted containing certain data, it may include or store any information relevant to the network, network devices, transmission of data, or data itself.

Network 107 represents any suitable network that facilitates communication between devices in system 100. Network 107 may communicate information and data to allow various endpoints and peer devices 103 to receive communications and data. In certain embodiments, network 107 may include, for example, a public network, a private network, a LAN, a Wide Area Network (WAN), a SD-WAN, a service provider's core network, etc. Network 107 may include multiple peer devices 103 (e.g., peer devices 103a-103c), one or more multicast receivers 105, and one or more multicast sources 101. The physical topology for network 107 may be a cloud (representing the WAN) with all peer devices 103 connecting to the cloud. For purposes of example and explanation, FIG. 1 shows certain connections between certain components (such as connections between certain peer devices 103). However, FIG. 1 does not imply a particular physical topology as the connections may be made via the cloud.

In general, network 107 may be an underlay network that supports a virtual overlay network. An underlay network may include, for example, all or a portion of the Internet, one or more IP networks (such as one or more IP Security, IPsec, networks), one or more MPLS networks, one or more cellular network(s), and/or other suitable networks. In certain embodiments, the virtual overlay network may include data plane connections/tunnels that carry traffic between components of network 107. As an example, the virtual overlay network may include IP Security (IPsec) tunnels that carry traffic between components of network 107. In certain embodiments, the virtual overlay network may carry traffic between a plurality of sites over the underlay network. Each site may connect to the network via one or more WAN-edge routers.

In an exemplary embodiment of operation, the multicast source 101, customer edge device 102, peer devices 103, provider edge device 104, multicast receiver 105, and any other devices in system 100 communicate via multicast virtual private network border gateway protocol (MVPN BGP) signaling when they connect to network 107. The devices in system 100 configure multicast protocol with EVPN information and exchange protocols and data between the devices and initialize as a multicast system. If, for example, peer device 103a receives traffic from the multicast source 101, peer device 103a may originate an EVPN source active route and create a routing table 106 relating to that route. Peer device 103a may then transmit routing table 106 to devices in network 107, including peer devices 103b and 103c and provider edge device 104, as a single packet through control plane flooding. Peer devices 103b and 103c and provider edge device 104 may save the data from routing table 106 locally.

In particular embodiments, a multicast tree may be generated to determine a path between the multicast source 101 and one or more multicast receivers 105. Multicast trees may be initiated by a multicast receiver 105 signaling a request to join a group receptive of data from the multicast source 101. In embodiments, a path may be generated from the multicast receiver 105 to the multicast source 101 hop-by-hop via peer devices 103, provider edge device 104, and customer edge device 102, using the source address. Once the path of a multicast tree is generated from the multicast receiver 105 to the multicast source 101, the source traffic from multicast source 101 may flow to the multicast receiver 105. In certain embodiments, multiple multicast trees may be generated, such that there is more than one multicast tree in place to transmit data if any of the peer devices 103 in network 107 fail or experience technical difficulty rendering them temporarily or permanently inoperable. Multiple multicast trees offer a technical advantage over conventional techniques because when in place, one peer device becoming inoperable would marginally impact traffic flow as traffic could resume in another operable tree quickly after a peer device becomes inoperable.

In certain embodiments, if one of the peer devices in the network becomes temporarily or permanently inoperable, e.g., network connectivity fails, hardware malfunctions, device power outages, and the peer device is a preferred device to transmit data from or through, then data can be transmitted through other operable peer devices in the network. In certain embodiments, the preference values in the route tables associated with the inoperable route and the operable routes can change to reflect a preference for data transmission using an operable route over the inoperable route.

In certain embodiments, reverse path forwarding can be used to transmit data when peer device(s) in the network become temporarily or permanently inoperable.

FIG. 2 illustrates a route table for propagating multi-homed source routes, in accordance with certain embodiments. In the illustrated embodiment, routing table 106 includes an address of the multicast group of an incoming packet, an address of the corresponding source of an incoming packet, one or more incoming interfaces, one or more outgoing interfaces, ESI information, EVI information and a preference value. Routing table 106 may also include a network identifier, a destination subnet, a netmask, a metric, a next hop or gateway, or any other information relevant to the multicast routes in network 107.

FIG. 3 illustrates a system for re-originating a route through a multi-home peer, in accordance with certain embodiments. In the illustrated embodiment, the system 100 includes a secondary routing table 301, with a preference value different from the preference value contained in routing table 106.

In an exemplary embodiment of operation, after the peer devices 103b and 103c and provider edge device 104 save the data from routing table 106 locally, the devices in system 100 may re-originate alternate routes. For example, if peer device 103b receives routing table 106 and saves the information, peer device 103b may use the saved ESI data from peer device 103a to determine that peer device 103a is in the same network as peer device 103b. Once peer device 103b determines that peer device 103a is in the same network, it then may originate a secondary route and secondary routing table 301. For example, if the preference value in routing table 106 is X, then the preference value in secondary routing table 301 may be X−1 to indicate that peer device 103a is the preferred peer device. Peer device 103b may then transmit the secondary routing table 301 to the last hop router, which is provider edge device 104 in the illustrated embodiment, or any other peer devices 103 through control plane flooding. When multicast receiver 105 requests particular traffic from multicast source 101 that has been transmitted to peer device 103a, provider edge device 104 may use the preference values it has saved from routing table 106 and secondary routing table 301 to determine from which peer device 103 to request the traffic. In this case, provider edge device 104 would request traffic from peer device 103a as it has already received the traffic from the multicast source 101. As will be explained in further detail below, the method and system may be affected if a peer device 103 is temporarily or permanently offline, disconnected from the network, broken, or removed from the network.

FIG. 4 illustrates a method for transmitting data using multi-homed source routes, in accordance with certain embodiments. Method 400 begins at step 401. At step 401, a peer device 103 receives a routing table 106 for a particular route with a preference value. For example, peer device 103b of FIG. 1 may receive a routing table from peer device 103a and store the data from the received routing table 106. Method 400 then moves from step 401 to step 402.

At step 402 of method 400, the peer device 103 that received a routing table 106 uses the ESI value stored from the received routing table 106 to determine if the routing table 106 was sent from another peer device 103 in the multi-home network 107. If the received routing table 106 is not from a device in the same network 107, then the peer device 103 repeats step 401 of method 400 for the next routing table 106 received. If the received routing table 106 is from a peer device 103 in the same network 107, then the peer device 103 moves to step 403. For example, peer device 103b of FIG. 3 may compare its stored ESI value to the ESI value contained in the routing table 106 it received from peer device 103a of FIG. 3. If the compared ESI values are the same, then method 400 moves from step 402 to step 403.

At step 403 of method 400, the receiving peer device 103 will generate a secondary routing table 301 with a preference value that is different from the preference value stored in routing table 106. The receiving peer device 103 may transmit the secondary routing table 301 to the last hop router or provider edge device 104 for storage. For example, peer device 103b generates a secondary routing table 301 with a preference value of X−1, e.g., 1, if the preference value of routing table 106 received at peer device 103b from peer device 103a is X, e.g., 2. The different preference values may indicate which route the multicast receiver 105 prefers to use to transmit data. Method 400 then moves from step 403 to step 404.

At step 404 of method 400, it is determined if the data, or packet, or traffic can be transmitted to the multicast receiver 105 using the preferred route. If the data, packet, or traffic can be transmitted to the multicast receiver 105 using the preferred route, method 400 moves from step 404 to step 405. If the data, packet, or traffic cannot be transmitted to the multicast receiver 105 using the preferred route, method 400 moves from step 404 to step 406. For example, if the routing table 106 from peer device 103a has a preference value indicative of a preference for the route associated with peer device 103a when compared to the preference value for the secondary routing table 301, and that particular route is capable of transmitting data, then method 400 moves from step 404 to 405. However, for example, if the routing table 106 from peer device 103a has a preference value indicative of an increased preference for the route, and that particular route is not capable of transmitting data, packet(s), or traffic to the multicast receiver 105, then method 400 moves from step 404 to 406.

At step 405 of method 400, the peer device 103 associated with the preferred route that is capable of transmitting data, packet(s), and/or traffic, would transmit the information to the multicast receiver 105 using the preferred route. For example, if the routing table 106 that peer device 103a sends indicates that the route associated with peer device 103a is preferred over the route associated with peer device 103b, and peer device 103a was capable of transmitting data, packet(s), and/or traffic to multicast receiver 105, then peer device 103a would send the data, packet(s), and/or traffic to multicast receiver 105 using the preferred route.

At step 406 of method 400, it is determined if the data, packet(s), and/or traffic can be transmitted to the multicast receiver 105 using a route other than the preferred route. For example, if the routing table 106 sent by peer device 103a indicated that the route associated with peer device 103a was to be preferred over the route associated with peer device 103*b*, and peer device 103*a* was not capable of transmitting data, packet(s), and/or traffic to multicast receiver 105, then multicast receiver 105 would look to the secondary routing table 301 to determine if alternate routes are available to transmit the data, packet(s), and/or traffic. For example, once the multicast receiver 105 cannot use the route from peer device 103*a*, it may then check the other routing tables stored, including the secondary routing table 301, to see if there are any back-up routes available for use, though not preferred. Method 400 then moves from step 406 to step 407.

At step 407 of method 400, data, packet(s), and/or traffic are transmitted to the multicast receiver 105 using a route other than the preferred route. For example, multicast receiver 105 could use the secondary routing table 301 to determine that data should be transmitted from peer device 103*b*. Then, for example, peer device 103*b* may transmit the data, packet(s), and/or information to multicast receiver 105.

In certain embodiments, alternate routes are determined if any device fails in network 107. Alternate routes may be determined using the preference values stored in the routing tables, e.g., routing table 106 and secondary routing table 301. For example, referring to FIG. 1, the preferred route for data, packets, or traffic to the multicast receiver 105 from the multicast source 101 would be through peer device 103*a* since that is where the traffic was originally routed to by customer edge device 102. However, if peer device 103*a* was experiencing technical difficulties or inoperable temporarily or permanently, then the traffic may be routed through peer device 103*b* instead of peer device 103*a*. If the multicast receiver 105 attempted to request the data from peer device 103*a* while it was not operable, then the request would not be successful. Then, the multicast receiver 105 could look at the preference value stored relating to peer device 103*a*. For example, peer device 103*a* may be the preferred routing device with a preference value of 1 in the routing table 106. Multicast receiver 105 may then look at the preference values it has stored in other routing tables, for example, secondary routing table 301 associated with peer device 103*b*, to determine which alternate route would be preferred because peer device 103*a* fails. The preference value stored in secondary routing table 301 may be 2 because it would be preferred second to peer device 103*a*, multicast receiver 105 may then determine that it should request the traffic from peer device 103*b* after the request to peer device 103*a* fails. This same system may occur with any number of peer devices 103, customer edge devices 102, provider edge devices 104, multicast receivers 105, and multicast sources 101 in network 107. The system 100 is not limited to the number of exemplary components depicted in FIGS. 1 and 3.

Although this disclosure describes and illustrates an example method 400 for a method for transmitting data using multi-homed source routes including the particular steps of the method of FIG. 4, this disclosure contemplates any suitable method 400 for transmitting data using multi-homed source routes, including any suitable steps, which may include all, some, or none of the steps of the method of FIG. 4, where appropriate. Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates particular components, devices, or systems carrying out particular steps of method 400 of FIG. 4, this disclosure contemplates any suitable combination of any suitable components, devices, or systems carrying out any suitable steps of method 400 of FIG. 4.

FIG. 5 illustrates an example of a computer system, in accordance with certain embodiments. In particular embodiments, one or more computer systems 500 provide functionality described or illustrated herein. As an example, one or more computer systems 500 may be used to provide at least a portion of system 100, multicast source 101, customer edge device 102, peer devices 103, provider edge device 104, multicast receiver 105, or network 107 described with respect to FIG. 1. As another example, one or more computer systems 500 may be used to perform one or more steps described with respect to FIG. 4. In particular embodiments, software running on one or more computer systems 500 provides functionality described or illustrated herein or performs one or more steps of one or more methods described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method of transmitting data, the method comprising:
   receiving, at a first peer device in a multi-home network, a first route table for a first route, wherein the first route table comprises at least a first Ethernet Segment Identifier (ESI), a first Ethernet Virtual private network Instance (EVI) and a first preference value;
   determining that the first route table was generated by and sent from a second peer device in the multi-home network;

originating at the first peer device, a second route table for a second route that does not include the second peer device in response to the determination, wherein the second route table is a route table distinct from the first route table and comprises at least a second ESI, a second EVI and a second preference value that is different than the first preference value;

transmitting the second route table to at least one peer device in the multi-home network;

determining a route to transmit data, wherein the determined route is the first route or the second route based on the first preference value and the second preference value;

transmitting the data using the determined route, wherein transmitting the data is based on at least one of the first ESI, the first EVI, the second ESI, or the second EVI; and generating at least one back-up tree of routes through control plane flooding, wherein the generating of at least one back-up tree of routes occurs before a peer device of a plurality of peer devices in the multi-home network fails.

2. The method of claim 1, further comprising:
determining that the data cannot be transmitted using the first route or the second route;
determining an alternate route; and
transmitting the data using the alternate route.

3. The method of claim 2, further comprising adjusting a preference value in a route table to transmit the data using a route of one of a plurality of peer devices in the multi-home network that is operable.

4. The method of claim 2, further comprising transmitting the data using reverse path forwarding when at least one of the first route and the second route fail.

5. The method of claim 1, further comprising:
evaluating a plurality of preference values to determine an order of routes, wherein each preference value of the plurality of preference values corresponds to a single route of a plurality of routes; and
transmitting the data using one of the plurality of routes in the determined order of routes.

6. A system, comprising:
one or more processors; and
one or more computer-readable non-transitory storage media comprising instructions that, when executed by the one or more processors, cause one or more components of the system to perform operations comprising:
receiving, at a first peer device in a multi-home network, a first route table for a first route, wherein the first route table comprises at least a first Ethernet Segment Identifier (ESI), a first Ethernet Virtual private network Instance (EVI) and a first preference value;
determining that the first route table was generated by and sent from a second peer device in the multi-home network;
originating a second route table for a second route that does not include the second peer device in response to the determination, wherein the second route table is a route table distinct from the first route table and comprises at least a second ESI, a second EVI and a second preference value that is different than the first preference value;
transmitting the second route table to at least one peer device in the multi-home network;
determining a route to transmit data, wherein the determined route is the first route or the second route based on the first preference value and the second preference value;
transmitting the data using the determined route, wherein transmitting the data is based on at least one of the first ESI, the first EVI, the second ESI, or the second EVI; and
generating at least one back-up tree of routes through control plane flooding, wherein the generating of at least one back-up tree of routes occurs before a peer device of a plurality of peer devices in the multi-home network fails.

7. The system of claim 6, further comprising:
determining that the data cannot be transmitted using the first route or the second route;
determining an alternate route; and
transmitting the data using the alternate route.

8. The system of claim 7, further comprising adjusting a preference value in a route table to transmit the data using a route of one of a plurality of peer devices in the multi-home network that is operable.

9. The system of claim 7, further comprising transmitting the data using reverse path forwarding when at least one of the first route and the second route fail.

10. The system of claim 6, further comprising:
evaluating a plurality of preference values to determine an order of routes, wherein each preference value of the plurality of preference values corresponds to a single route of a plurality of routes; and
transmitting the data using one of the plurality of routes in the determined order of routes.

11. One or more computer-readable non-transitory storage media embodying instructions that, when executed by a processor, cause performance of operations comprising:
receiving, at a first peer device in a multi-home network, a first route table for a first route, wherein the first route table comprises at least a first Ethernet Segment Identifier (ESI), a first Ethernet Virtual private network Instance (EVI) and a first preference value;
determining that the first route table was generated by and sent from a second peer device in the multi-home network;
originating a second route table for a second route that does not include the second peer device in response to the determination, wherein the second route table is a route table distinct from the first route table and comprises at least a second ESI, a second EVI and a second preference value that is different than the first preference value;
transmitting the second route table to at least one peer device in the multi-home network;
determining a route to transmit data, wherein the determined route is the first route or the second route based on the first preference value and the second preference value;
transmitting the data using the determined route, wherein transmitting the data is based on at least one of the first ESI, the first EVI, the second ESI, or the second EVI; and
generating at least one back-up tree of routes through control plane flooding, wherein the generating of at least one back-up tree of routes occurs before a peer device of a plurality of peer devices in the multi-home network fails.

12. The one or more computer-readable non-transitory storage media of claim 11, the operations further comprising:
   determining that the data cannot be transmitted using the first route or the second route;
   determining an alternate route; and
   transmitting the data using the alternate route.

13. The one or more computer-readable non-transitory storage media of claim 12, the operations further comprising adjusting a preference value in a route table to transmit the data using a route of one of a plurality of peer devices in the multi-home network that is operable.

14. The one or more computer-readable non-transitory storage media of claim 13, the operations further comprising transmitting the data using reverse path forwarding when at least one of the first route and the second route fail.

15. The one or more computer-readable non-transitory storage media of claim 13, the operations further comprising:
   evaluating a plurality of preference values to determine an order of routes, wherein each preference value of the plurality of preference values corresponds to a single route of a plurality of routes; and
   transmitting the data using one of the plurality of routes in the determined order of routes.

* * * * *